219-121

9/4/84 OR 4,469,932

United States Patent [19]

Spiegelberg et al.

[11] Patent Number: 4,469,932

[45] Date of Patent: Sep. 4, 1984

[54] PLASMA BURNER OPERATED BY MEANS OF GASEOUS MIXTURES

[75] Inventors: Karl Spiegelberg, Berlin; Herbert Hoffmann, Hennigsdorf; Helmfried Jeske, Hennigsdorf; Alexander Kolm, Hennigsdorf; Fred Ebeling, Berlin, all of German Democratic Rep.

[73] Assignee: VEB Edelstahlwerk, Freital, German Democratic Rep.

[21] Appl. No.: 427,374

[22] Filed: Sep. 29, 1982

Related U.S. Application Data

[63] Continuation of Ser. No. 231,608, Feb. 5, 1981, abandoned.

[30] Foreign Application Priority Data

May 30, 1980 [DE] Fed. Rep. of Germany ......... 221458

[51] Int. Cl.³ ........................ B23K 9/00

[52] U.S. Cl. ........................ 219/121 PA; 219/75; 219/121 PP; 219/121 PQ; 313/231.31

[58] Field of Search ...... 219/121 P, 121 PM, 121 PP, 219/121 PQ, 121 PR, 74, 75; 315/111.21; 313/231.31–231.51

[56] References Cited

U.S. PATENT DOCUMENTS

| | | | |
|---|---|---|---|
| 3,534,388 | 10/1970 | Ito et al. | 219/121 PQ |
| 3,604,889 | 9/1971 | Rohrberg | 219/121 PQ |
| 3,692,973 | 9/1972 | Oku et al. | 219/121 PK |
| 3,900,762 | 8/1975 | Sheer et al. | 219/121 PM |
| 3,949,188 | 4/1976 | Tateno | 219/121 PM |

*Primary Examiner*—M. H. Paschall

*Attorney, Agent, or Firm*—Gabriel P. Katona

[57] ABSTRACT

The present invention relates to a plasma burner for metallurgical furnaces which is operated with gaseous mixtures, wherein an addition gas is fed to the plasma burner via a ring conduit into the inside of the burner. The gas conduction pipes on the addition-gas outlet are arranged at a predetermined angle to the longitudinal axis of the burner, 35° to 45°. The point of intersection between plasma arc and addition gas is 25 to 45 mm in front of the rod-shaped cathode. In order to increase the output with constant arc current and without chemical reaction with as molten material, hydrogen or nitrogen is used as addition gas; and when a chemical reaction is desired, oxygen or oxygen-containing gas mixtures are used.

4 Claims, 1 Drawing Figure

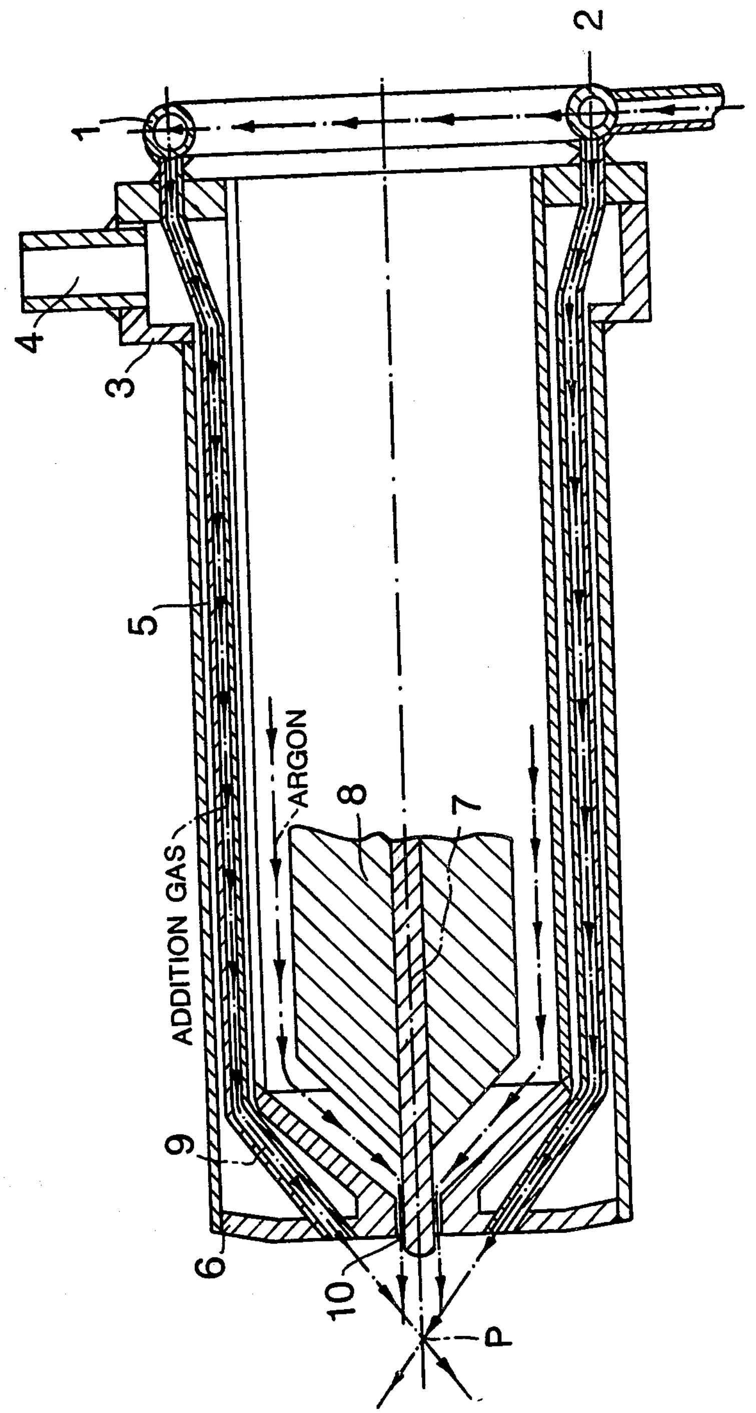
1
2
3
4
5
6
7
8
9
10
ARGON
ADDITION GAS
P

PLASMA BURNER OPERATED BY MEANS OF GASEOUS MIXTURES

This is a continuation of Ser. No. 231,608, now abandoned, filed on Feb. 5, 1981.

BACKGROUND OF THE INVENTION

The present invention relates to the field of metallurgy and in particular to the melting of metals and alloys in plasma melting furnaces in which plasma burners of high output are used.

The plasma melting torches of high power used up to now for the melting or remelting of metallic materials use technically pure argon as the operating gas. This operating gas, on the one hand, protects the highly heated tungsten cathode within the burner from burning up and determines essentially the composition of the furnace atmosphere over the molten material and thus the basic electric parameters of the plasma column, such as voltage gradient along the column, arc voltage and arc temperature of the plasma column. From this there arose the idea of controlling these electric arc parameters by the admixture of diatomic gases, for instance to increase the output of the burner with constant current intensity by increased arc voltages and to influence the course of the melting through the utilization of chemical reactions between the molten material and a furnace atmosphere which is suitably adjusted by means of the operating mixture. However, one prerequisite for operation with gaseous mixtures was that the hot tungsten cathode not come into contact with oxidizing gases, so as to avoid the burning up of the cathode which would then take place. Oxidizing gas mixtures therefore drop out of consideration from the very start as operating gas for such melting burner designs. The use of other cathode materials which remain operable in an $O_2$-containing operating gas without being burned up, such as also used for instance in plasma cutting torches, for example zirconium oxide cathodes, was possible heretofore only with low current intensities. An increase of the output of plasma burners for the melting of metallic materials was not possible with the known solutions.

SUMMARY OF THE INVENTION

The goal of the present invention is to provide a plasma burner which is operated with gaseous mixtures and operates reliably with high output.

The object of the invention is to develop a plasma burner which makes it possible to feed addition gases of various type to the plasma arc in order in this way to impart a desired course to the parameters of the electric arc on the one hand and, on the other hand—on basis of the composition of the furnace atmosphere together with the high temperature of the plasma arc—to the chemical reactions between the molten material and the furnace atmosphere of the molten material, its slag covering and the furnace atmosphere without neglecting the required protection of the highly heated tungsten rod cathode from impermissible cathode burn up. This result is achieved by the invention in the manner that the addition gas is fed to the plasma burner by a ring conduit from which gas conduction pipes pass through the inside of the plasma burner. The gas conduction pipes are arranged symmetrically at the outlet for the addition gas over an index circle around the nozzle opening and are inclined by an angle of 35° to 45° with respect to the longitudinal axis of the plasma burner.

The place of intersection between the plasma arc and addition gas is preferably at a distance of 25.0 to 45.0 mm from the surface of the rod-shaped cathode. The selection of the addition gas depends on the desired influence of the gas on the course of the melting. In order to increase the voltage gradient along the plasma-arc column and thus to increase the power of the plasma arc with constant arc current and without chemical reaction with the molten material, molecular gases such as hydrogen or nitrogen are selected. If a specific course of chemical reaction of the addition gas with the molten material is to be obtained, oxygen or oxygen-containing gaseous mixtures are used as the addition gas. In order to obtain a higher velocity of the addition gas, insert members can be arranged in the openings of the addition-gas outlet.

The invention will be explained in further detail below with reference to an illustrative embodiment.

BRIEF DESCRIPTION OF THE DRAWING

The accompanying drawing shows a partial longitudinal section through the plasma burner of the invention.

DETAILED DESCRIPTION OF THE INVENTION

On the attachment end of a plasma burner, the basic principle of which is known there is arranged, in the vicinity of cooling-water inlet 4, a ring conduit 1 on which gas connection 2 is located. From this ring conduit 1 a number of gas conduction pipes 3 extend along water cooling slot 5 into the inside of the plasma burner. The addition gas arrives through the gas conduction pipe 3, via addition-gas outlet 9, at nozzle opening 10 of copper nozzle 6. The openings of the addition-gas outlets 9 are inclined by 35° to 45° with respect to the longitudinal axis of the plasma burner on a pitch circle symmetrically to nozzle opening 10. in this way the result is obtained that the place of intersection P between plasma arc and addition gas is at a distance of 25.0 to 45.0 mm in front of the surface of the rod-shaped cathode 7 so that no burning off takes place. Cathode 7 itself is cooled via cathode block 8 and is protected by the stream of argon, which is not affected here by a addition gas. The selection of the nature of the addition gas and the amount of gas will be determined by the influence desired by the gas on the course of the melting. In order to increase the voltage gradient along the plasma arc column and thus increase the power of the plasma arc with constant arc current, molecular gases such as hydrogen or nitrogen are selected which do not form chemical compounds with the molten material, for instance steel. For a directed course of the chemical reactions between the addition gas and the molten material, with due consideration of the high gas temperature prevailing in the plasma arc and the degree of ionization of the molecular gases inherent therein, for example for the refining of molten steel, addition gases of suitable composition are selected. For the carrying out of the refining process, oxygen or oxygen-contaning gaseous mixtures are employed. The quantity of addition gas fed to the plasma burner is in this case determined by the purpose of use and is regulated by means of the gas pressure.

In order to obtain sufficient gas velocities at the addition-gas outlets 9 the cross sections of these openings can be varied by the provision of insert members, not shown in the drawing.

We claim:

1. A plasma burner operable with gaseous mixtures for the melting of metals and alloys, comprising: a tubular body having means forming a cylindrical nozzle opening at one end and receptive of a supply of gas; a longitudinally extending rod-like cathode extending through and protruding outwardly of the nozzle opening and configured to form a cylindrical annular passage therearound which directs the nozzle flow outwardly of the tubular body and parallel to the cylindrical surface of the cathode; a ring conduit at the other end of the tubular body and receptive of a supply of an addition gas; a plurality of gas conduction pipes connected at one end to the ring conduit, extending longitudinally within the tubular body along the entire length of the tubular body and opening at said one end symmetrically on a pitch circle around the nozzle opening at an angle of from 35° to 45° with respect to the longitudinal axis of the tubular body and configured to position the point of intersection of the nozzle flow and the addition gas flow at 25 to 45 mm from the end of the cathode protruding out of the nozzle opening.

2. The plasma burner according to claim 1, wherein the addition gas comprises molecular gases which do not chemically react with the melt and which are selected from the group of hydrogen and nitrogen.

3. The plasma burner according to claim 1, wherein the addition gas comprises gases which chemically react with the melt and which are selected from the group of oxygen and oxygen contaning gaseous mixtures.

4. The plasma burner according to claim 1, further comprising insert members in the addition gas conduit openings to effect a higher addition gas exit velocity.

* * * * *